United States Patent [19]
Wivagg et al.

[11] Patent Number: 5,793,828
[45] Date of Patent: Aug. 11, 1998

[54] METHOD AND APPARATUS FOR REPAIR OF NUCLEAR REACTOR SHROUD

[75] Inventors: Adrian Peter Wivagg, Tolland; Karl Heinz Haslinger, Bloomfield, both of Conn.

[73] Assignee: Combustion Engineering, Inc., Windsor, Conn.

[21] Appl. No.: 633,440

[22] Filed: Apr. 17, 1996

Related U.S. Application Data

[63] Continuation-in-part of Ser. No. 505,785, Jul. 21, 1995, Pat. No. 5,623,526.

[51] Int. Cl.$^6$ .................................................. G21C 19/00
[52] U.S. Cl. .......................... 376/260; 376/285; 376/302; 29/402.14
[58] Field of Search .............................. 376/260, 285, 376/287, 302; 29/402.08, 402.14, 402.15, 723, 906

[56] References Cited

U.S. PATENT DOCUMENTS

| | | | |
|---|---|---|---|
| 4,172,011 | 10/1979 | Seed et al. | 376/461 |
| 4,859,403 | 8/1989 | Dixon et al. | 376/286 |
| 5,065,490 | 11/1991 | Wivagg et al. | 29/402.14 |
| 5,392,322 | 2/1995 | Whitling et al. | 376/302 |
| 5,402,570 | 4/1995 | Weems et al. | 376/302 |
| 5,430,779 | 7/1995 | Baversten et al. | 376/302 |
| 5,521,951 | 5/1996 | Charnley et al. | 376/302 |
| 5,623,526 | 4/1997 | Wivagg | 376/302 |
| 5,654,992 | 8/1997 | Uraki et al. | 376/260 |

FOREIGN PATENT DOCUMENTS

1271594   4/1972   United Kingdom.

*Primary Examiner*—Daniel D. Wasil
*Attorney, Agent, or Firm*—Ronald P. Kananen; John H. Mulholland

[57] ABSTRACT

In order to support a shroud against bending, shear, stress and torsion, straps are placed in strategic positions with respect to cracks or like types of weaknesses which have been detected, and fastened in place using a suitable fastening technique. Holes are formed using an EDM technique in cooperation with supports for an EDM placed on the straps, and bolt units which have an expanding portion are inserted into the holes, torqued and expanded in a manner which fastens the strap to the shroud. A temperature responsive bimetallic strain system which produces a clamping force, is created by forming the straps of a material which has a lower expansion coefficient than the shroud material. As the reactor heats, the expansion differential tensions the straps and produces a clamping force.

14 Claims, 10 Drawing Sheets

METHOD AND APPARATUS FOR REPAIR OF NUCLEAR REACTOR SHROUD

CROSS-REFERENCE TO COPENDING APPLICATIONS

This is a Continuation-in-part of U.S. patent application Ser. No. 08/505,785, filed on Jul. 21, 1995, now U.S. Pat. No. 5,623,526, assigned to the assignee of this invention.

BACKGROUND OF THE INVENTION

1. Field of the Invention

The present invention relates to a repair technique for a nuclear reactor and more specifically to a repair technique wherein straps are fastened to an exterior surface of a shroud which surrounds the fuel rods to repair and/or reinforce cracks or like types of faults which have developed in the shroud.

2. Brief Description of the Related Art

Figure 1:
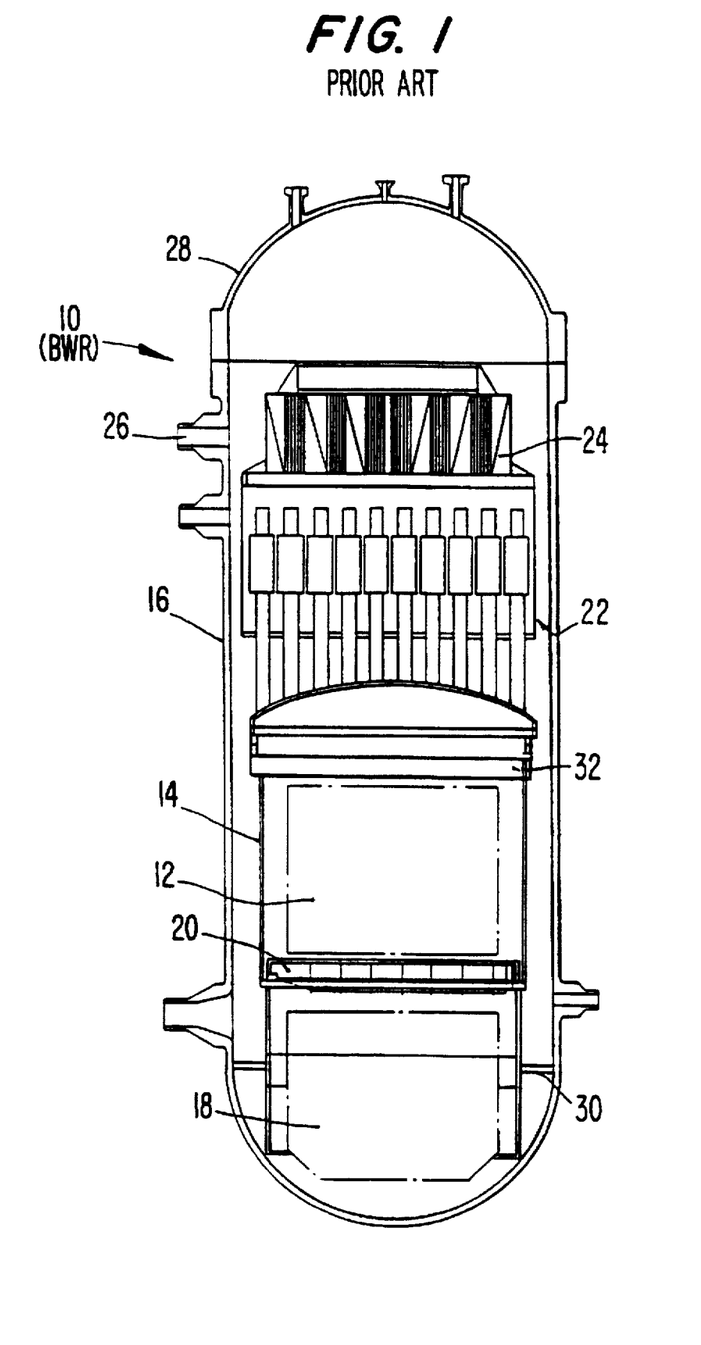
FIG. 1 is a cut-away view showing the interior of a BWR of the type discussed in the opening paragraphs of the disclosure.

Nuclear reactors, such as the boiling water type (BWR) 10 shown in FIG. 1, enclose a plurality of spaced fuel rods, generally denoted by the numeral 12, within a shroud 14 which is supported within the reactor pressure vessel (RPV) 16. The shroud 14 locates on the core support plate 20 and the top guide 32. It also supports a separator arrangement 22 and maintains a volume of water over the fuel rods 12. In this arrangement, a plurality of control rods 18 are disposed below the fuel rods 12 and are arranged to move up through the core support plate 20 into position to control the combustion of the nuclear fuel. The separator arrangement 22 is located on top of the shroud 14, while a dryer 24 is arranged at a still higher level and essentially opposite a main steam line 26. A pressure vessel head 28 is secured to the upper flange of the reactor pressure vessel in a manner which hermetically seals off the top of the RPV 16.

Figure 2:
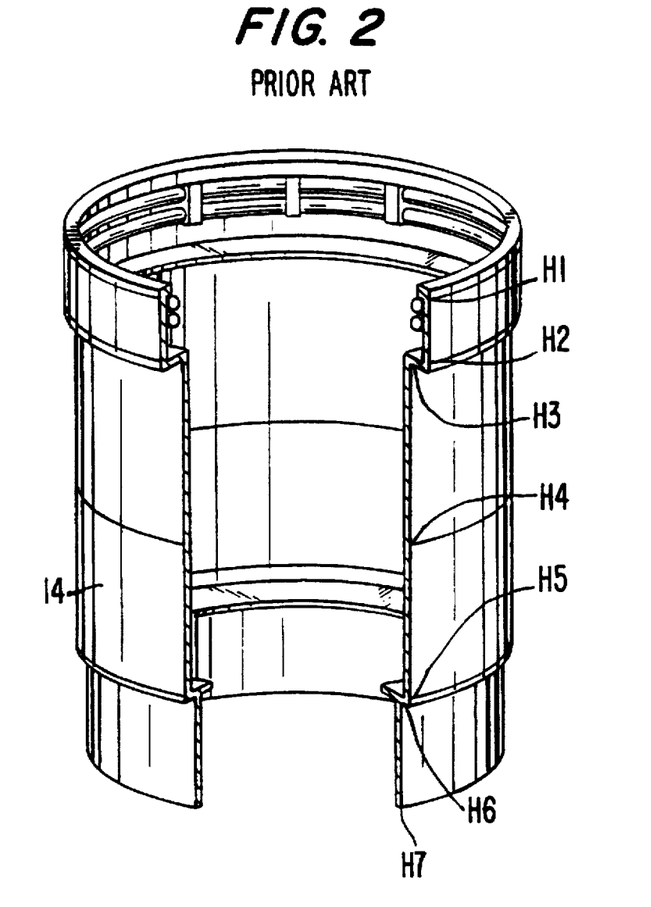
FIG. 2 is a perspective, partially cut-away view of a shroud which is used in the BWR shown in FIG. 1, and which shows typical welds which are included in its construction.

As shown in FIG. 2, the shroud 14 is constructed of a number of cylindrical and/or annular sections which are welded together. In the shroud shown in FIG. 2, only seven (H1 to H7) of the welds, which form essential parts of the shroud structure, are shown. However, it is possible that, due to intergranular stress corrosion cracking (IGSCC) and other metallurgical phenomenon, cracks can develop in the shroud, particularly at the sites of the welds, and lead to a situation wherein portions of the shroud can separate in an undesirable manner which may interfere with the proper operation of the reactor.

Repair of such types of cracks is of course difficult and usually requires the fuel (fuel rods 12) to be offloaded and the repair carried out with the fuel stored in a separate holding pool. However, as will be appreciated, in order for the fuel rods 12 to be released, lifted out of the reactor vessel and immersed in a holding tank, all of the apparatus which is disposed in the reactor above the fuel rods must first be removed and placed in holding tanks. Accordingly, the number of operations which must be carried out before the actual repair work can begin is substantial and the length of the outage of the reactor is prolonged considerably. Even in the case of relatively minor cracks, the above-mentioned troublesome removal of the dryer 24, the shroud head and separator arrangement 22, and the fuel rods 12 must be carried out before repair operations can be initiated, irrespective of the fact that the repair operation itself may be relatively simple and quickly carried out.

SUMMARY OF THE INVENTION

It is an object of the present invention to provide a technique which enables the repair of the shroud without the need to remove the fuel from the reactor.

It is a further object of the invention to provide a simple apparatus which can be used to fortify or repair a nuclear reactor shroud while the fuel is still in the reactor pressure vessel.

It is yet another object of the invention to provide a repair technique which involves the use of straps which are fastened to the external surface of the shroud in a manner which supports the shroud against bending forces, shearing forces, and torsion forces.

A further object of the invention is to provide a structure on the straps which supports a cutting machine in a manner which enables the cutting machine to be lowered into place with the strap and used to cut a support hole into which predetermined types of strap support bolt units are inserted.

A further object of the invention is to provide a shroud repair technique which makes use of straps which are formed of a material which exhibits different expansion characteristics from the material from which the shroud is formed, and which establish a thermally responsive bimetallic system which enables the straps to be tensioned in response to reactor heat-up and thus establish a strong clamping action.

In brief, the above mentioned objects and others are achieved by an arrangement wherein straps are placed in strategic positions with respect to cracks or like types of weaknesses which have been detected in the shroud, and fastened in place using a suitable fastening technique. In the preferred embodiments of the invention, holes are formed using an EDM technique and bolt units which have an expanding portion are inserted into the holes, torqued and expanded in a manner which fastens the strap to the shroud. Welding and like types of fastening techniques are not excluded and may be used alternatively or in combination with the bolting technique as required.

The length of the straps is variable and can be selectively varied so that a suitable number of welds are spanned and the required amount of support is provided. A plurality of straps can be used. The number of straps varies with the problem that needs solving. The separation or interval between the straps need not be uniform. For example, if four straps are used they need not necessarily be arranged uniformly at 90° intervals. In the event that a number of straps are used, the length of each strap can be varied as necessary under the instant set of conditions and the degree of support which is required to ensure that the shroud exhibits the desired degree of structural strength for horizontal, vertical and lateral welds.

While straps can be made of the same material as the shroud, it is, in accordance with a preferred embodiment of the invention, possible to use a material which is different and which exhibits lower expansion characteristics given that this material does not induce corrosion or undergo thermal or radiation induced changes which endangers the support that is intended to be provided by the straps.

Electron discharge machining (EDM) is used in connection with the preferred embodiments for removing metal and cutting holes and the like. This technique is favored in that tooling loads during cutting are negligible and chips and like type of debris are not formed or, alternatively, are easily collected.

The combination of the straps with other support structure is not excluded from the scope of the invention. This support structure can be arranged to be disposed either internally or externally of the shroud. For example, U.S. Pat. No. 5,430,779 to Baversten et al. issued on Jul. 4, 1995, and co-pending U.S. patent application Ser. No. 08/241,441 filed on May 11, 1994 in the name of Baversten, and assigned to the assignee of this invention, could be referred to for teachings pertaining to support structures which could be used in connection with the present invention. The disclosures of these two documents are hereby incorporated by reference.

More specifically, a first aspect of the present invention resides in a nuclear reactor having an essentially cylindrically-shaped shroud formed of a plurality of annular segments which are welded to one another and which features: an elongate essentially straight or linear strap which extends essentially parallel to an axis of the cylindrically-shaped shroud and which is securely fastened to an external surface of the shroud, the strap being arranged to span at least one of the welds of the shroud, and be able to withstanding bending, shearing and tension forces which are applied to said shroud.

A second aspect of the present invention resides in a method of repairing an essentially cylindrically-shaped shroud formed of a plurality of annular segments which are welded to one another, comprising the steps of: placing a strap against a predetermined portion of an external surface of the shroud wherein the strap spans at least one of the welds which secures the segments of the shroud together; forming a plurality of holes through the strap and the shroud; disposing fastening means through the plurality of holes to fasten the strap to the shroud and to render the strap integral with the shroud.

Another feature of the strap allows the fabrication of EDM support fasteners. The EDM operation is shortened through the use of the prelocated tooling positions. In accordance with the present invention each of the straps which are used is an elongated flat structure but may alternatively have a channel, H beam or other cross-sectional shape which provides the required strength.

A further and highly important aspect of the invention resides in the use of straps which are made of a material which is different from that from which the shroud is constructed and which establishes a thermally responsive bimetallic system. More specifically, the strap metal is selected to exhibit a thermal coefficient of expansion which is less than that of the shroud material so that when the system temperature increases during heat up, the strap material expands less than the shroud thus creating a clamping action. The straps are also attached to the shroud with the special patented P-bolt units (described later in greater detail) which are inserted through the straps and into the shroud. The holes in the shroud are made by EDM machining with tooling precisely gauged to the straps for a close fit of these P-bolt units. This arrangement does not rely on the integrity of either of the lower welds H8 or H9 so that a failure of these welds does not cause a failure of the repair, nor does it apply any loads to the H8 or H9 welds.

This repair technique/structure does not rely on any horizontal snubber type support system. By establishing a predetermined minimum preload (e.g. 80,000 lb.), the shroud is entirely protected from lift-off due to uplift forces at normal operating conditions. In case of large seismic overturning moments, a small gap may instantaneously open and close on one shroud side while the opposite side experiences additional compressive load. The presence of these large vertical compressive forces is sufficient to prevent lateral movement of any shroud segment with respect to the others. This is based on a conservatively assumed shear resistance coefficient of 0.4 to 0.5. In actuality, and because of the rough surface conditions of the cracked regions, resistive shear forces can be much higher. Nevertheless, should any lateral movement be possible, the straps will function as additional restraints.

The preloads in the straps are controlled by their design features and installation clearances. The establishment of preloads depends on different thermal growth rates between the shroud and the strap materials. During plant heatup, the installation clearances are taken up. Following this, preload will then increase proportionally to increase in temperature.

Consideration has to be given to normal operating conditions and to the various stipulated transient conditions. The most severe temperature difference is expected during a loss of feedwater heater. Under these conditions, there may exist as much as 130° F. temperature difference between the shroud wall and annulus fluid. However, with the strap construction used in this aspect of the invention, the intimate contact between strap and shroud provides sufficient thermal conduction to limit the average metal temperature differences to less than 80° F. for example. Nevertheless, the arrangement is adequate for a metal temperature difference of at least 100° F.

The strap material in the disclosed embodiment is typically a material such as Inconel X-750 which is a high strength Ni-Cr alloy having a lower coefficient of thermal expansion than the 304 Stainless Steel (18Cr-8Ni material) from which the shrouds are usually made. This combination creates a temperature responsive bimetallic strain system making a clamping force possible. The critical dimensions of the strap are determined by this factor and the space available at the lower end of the shroud below the H7 weld. A smaller pin or P-bolt can be used for the lower strap connection because of the greater bearing strength of the Inconel 600 support ring at this location. This lower pin is approximately 3.5 inches in diameter. On the other hand, the upper P-Bolts are approximately 5 inches in diameter. Each strap has a loop of material which goes around the pin or bolt unit. An oval hole may be formed in this loop to provide uniform stresses in the strap.

The center section of each strap is sized to provide the correct load in the bimetallic strain system previously described. The entire strap is designed to maintain close contact with the shroud in order to provide a heat transfer path during accident conditions. This helps to maintain the difference in temperature between the strap and shroud lower than the difference in fluid temperatures thereby maintaining the clamping force in a range below the material yield stress. The strap design accommodates shroud weld areas due to the weld buildup and backing rings employed by this type of shroud design. The transition in diameters between the center and lower shroud sections is also accounted for in this way.

Each lower strap of the arrangement provides a clamping force for the H5, H6, and H7 welds. Associated upper straps, if provided, provide a clamping force for the H4 weld if that option is desired. The upper straps may be added at a later outage than that during which the lower straps are provided, if desired. The length and width of the straps are sized for a specific unit.

In order to facilitate the installation of the straps, integral fittings are provided to allow the attachment of the tooling necessary to EDM holes in the shroud for the pins. This allows some of the tooling to be delivered with the strap, reducing the overall time for installation.

No welding is used in the manufacture of the straps which may be constructed by forging or machining the X-750 stock.

The P-Bolts used in the embodiments of the invention are of a unique two piece design which allows the pin to be inserted and locked in place from one side of the assembly. At least two different size P-Bolts are used although all have the same patented design. The lower pin is approximately 3.5 inches in diameter and it attaches the lower strap to the Inconel section of the shroud. The center pin is approximately 5 inches in diameter and is used to attach the upper and lower straps to the 304 portion of the shroud. The upper pin is also approximately 5 inches in diameter and attaches the top of the top strap to the shroud.

BRIEF DESCRIPTION OF THE DRAWINGS

The present invention will become more clearly appreciated as a description of the preferred embodiments is made with reference to the appended drawings in which.

DETAILED DESCRIPTION OF THE PREFERRED EMBODIMENTS

Figure 3:
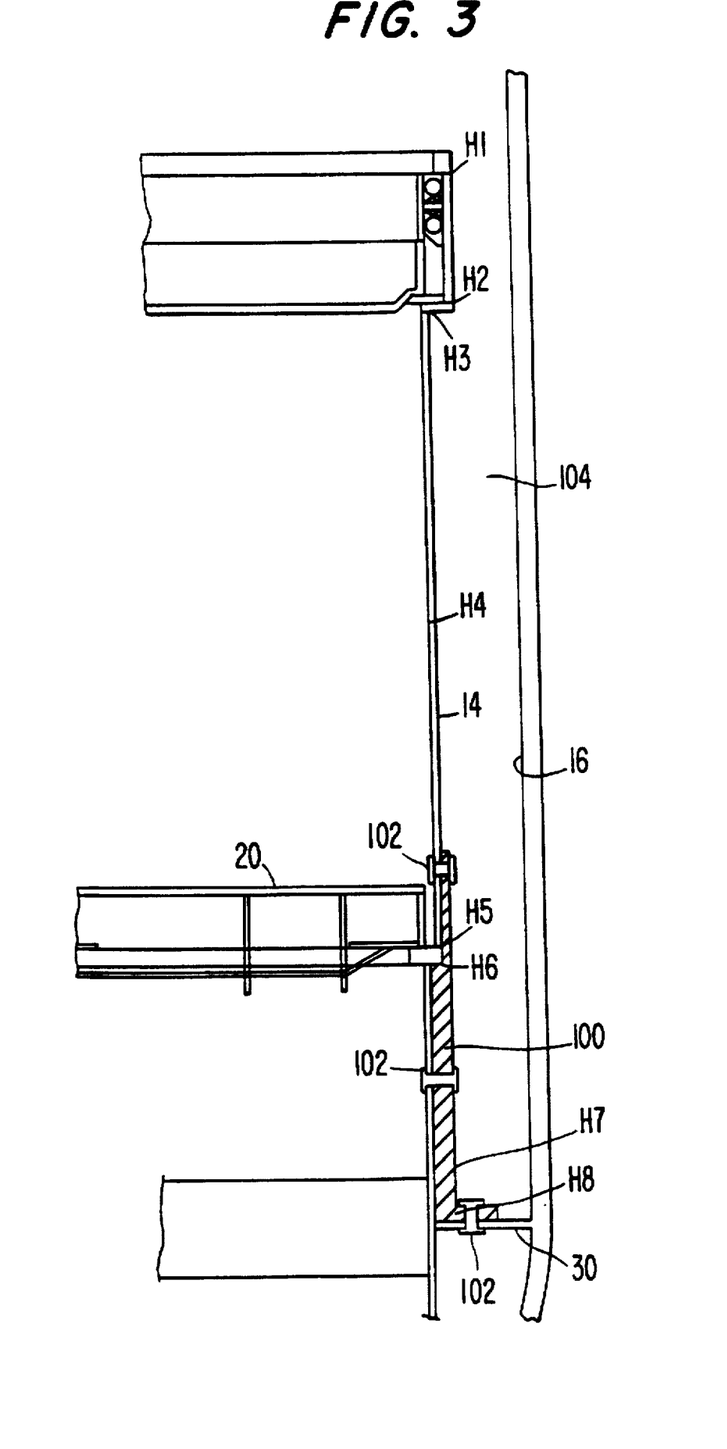
FIG. 3 is a vertical section showing a strap arrangement according to a first embodiment of the present invention.
Figure 4:
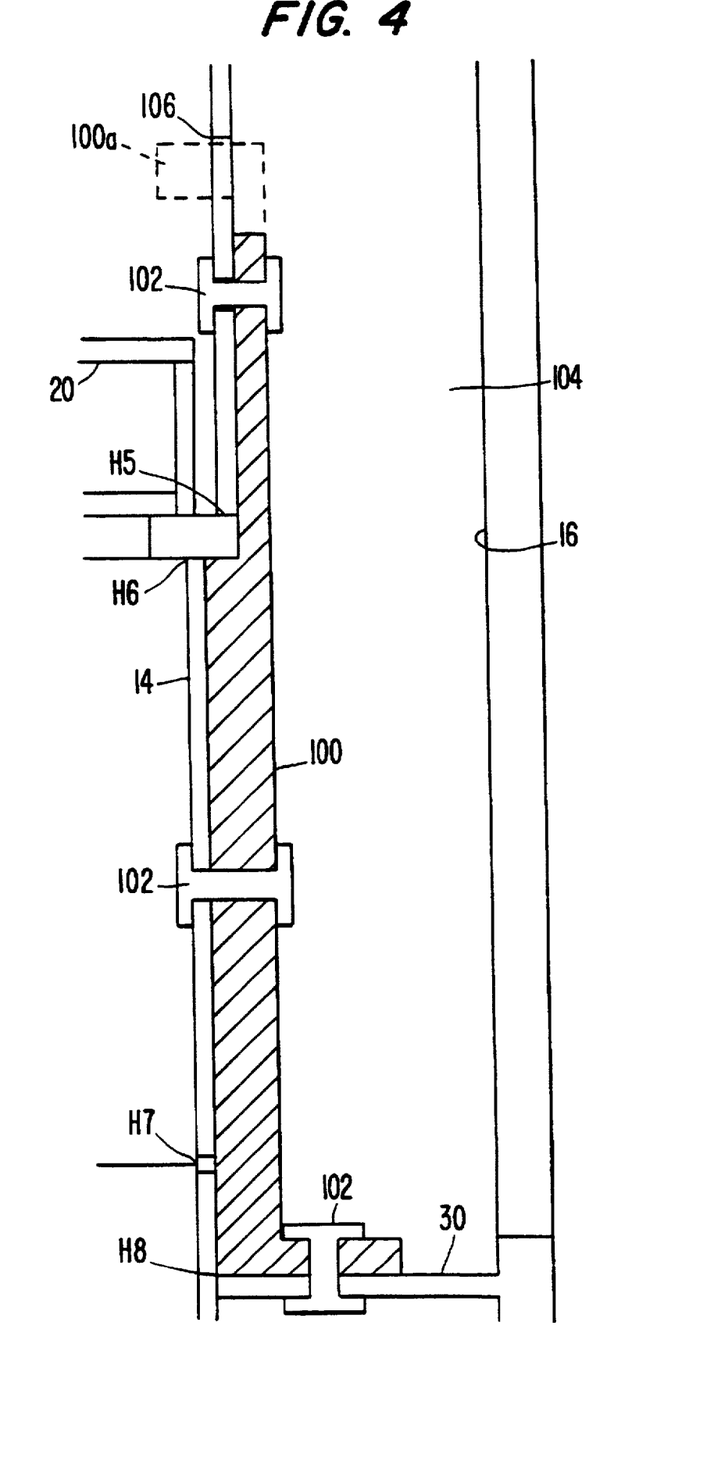
FIG. 4 is an enlarged view of the strap shown in FIG. 3 depicting the use of "P-bolts" which are used to fasten the strap in place against the exterior of the shroud.

FIGS. 3 and 4 show details of a first embodiment of the invention. In this arrangement, straps 100 which are made of the same material as the shroud 14, for example stainless steel 304, are, in this embodiment, fastened to the shroud using so called "P-bolts" 102. While it is to be specifically noted that the invention is not limited to the use of these so called P-bolts, this particular type of fastening technique is preferred in connection with this embodiment.

Each P-bolt is constructed of two pieces which act together to provide the bolting action required. The outer piece has fingers which snap through the opening and grab the other (inner) side of the shroud. When the inner pin is threaded through the center, the fingers are locked in place. The outer pin is restrained from turning during the installation. Tabs are attached to the pin or strap which are bent into the opposing piece to prevent rotation. This arrangement is similar to some feedwater sparger attachments to the vessel. The P-bolt parts are torqued together to establish a tight fit in the bore in the P-bolt is disposed.

For further disclosure pertaining to the above-mentioned P-bolts, reference may be had to U.S. Pat. No. 5,065,490 issued to Wivagg et al. on Nov. 19, 1991. The disclosure of this patent is hereby incorporated by reference.

The illustrated strap arrangement is such as to span the H5 to H8 welds. A plurality of straps 100, for example four or more straps, can be used; however, in this embodiment they need not necessarily be uniformly arranged at 90° intervals and the spacing is determined on a case-by-case basis depending on the reinforcement which is required and the space which is available.

Prior to being submerged, each strap 100 is mounted on a delivery fixture and fitted with three (by way of example only) EDM heads (not shown) which are positioned at the sites where the P-bolt connections are required. Each of the straps is then lowered down through the annulus 104 defined between the shroud 14 and inner wall of the pressure vessel 16, using a so called "rigid pole" system. When each of the straps 100 is maneuvered into the desired position, the EDM tool heads cut the appropriately shaped holes through the wall of the shroud. The EDM heads are then remotely released and removed while the strap is maintained in position. The P-bolts 102 are then lowered into position, slid into the strap, threaded in and expanded. Each P-bolt 102 is then crimped to lock it in place. In the illustrated embodiment, the strap has an L-shape and the lower end or foot 100f fastened to a shroud support plate 30.

The EDM process is carried out in a manner wherein the tooling loads are negligible and no chips are produced during each cut. The fines which are produced during the cutting operation are flushed out by the water which is directed through the electrode by flushing pumps which create a suction on the shroud and pass the water through filters. The filters in this instance are 0.8 micron and capture 99.9% of the fines in the water which is pumped through the area of the EDM electrodes.

An alternative to the above "pre-mounting" technique resides in the strap being placed in position and the EDM cutting tools, which are supported at the ends of a delivery mast, then delivered into position in the annulus between the shroud and the pressure vessel using the above mentioned rigid pole system. Tool fixtures including alignment features and positioning clamps are used to secure the mast and the tool head at the proper location for the respective cuts.

It will be noted that the shroud 14, to which the strap according to the first embodiment of the invention is applied, has eight welds H1 to H8; and that the strap 100 illustrated in FIG. 3 is such as to span welds H5 to H8. This strap is able to withstand bend, and shear in addition to tension, and thus, when fastened to the shroud in the illustrated position, is able to securely support the shroud against bending and shearing forces as well as tension, and thus can be expected to increase the strength and resistance of the shroud to forces produced by seismic activity and the like for both horizontal and vertical welds.

It will be noted that FIG. 4 shows a variant of the first embodiment. In this figure, an opening 106 is formed in the shroud 14 immediately above the top of the strap 100 and a flange section 100a is formed at the upper end of the illustrated strap 100. The flange 10a is arranged to project through the hole 106 into the interior of the shroud 14 where it can be connected to an internal tie rod or the like type of structure.

SECOND EMBODIMENT

Figure 5:
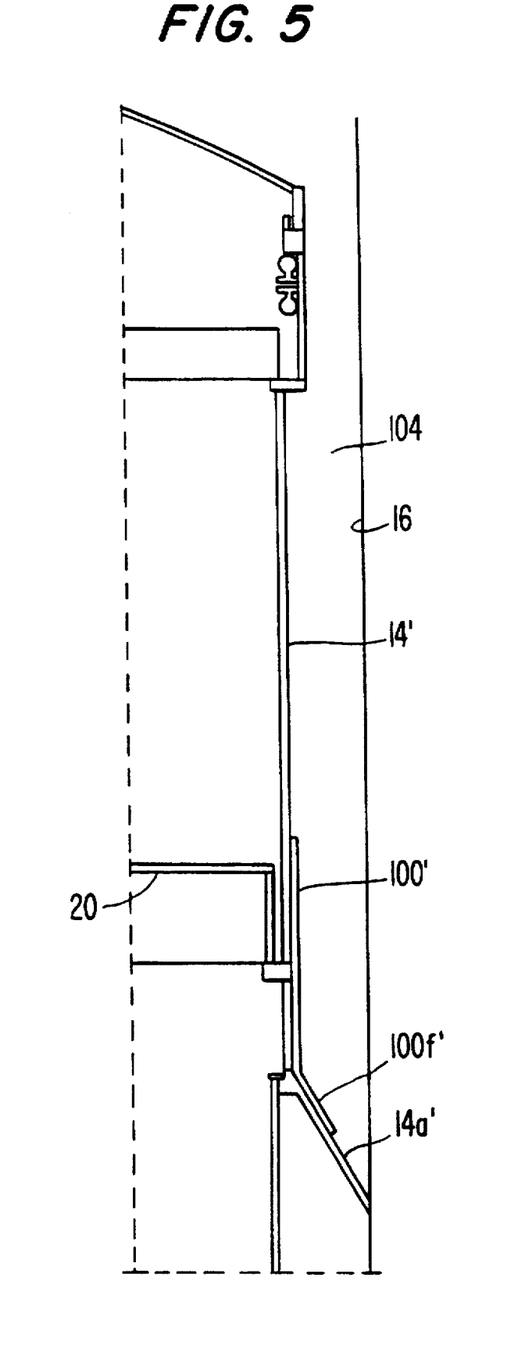
FIG. 5 is an elevational view showing a strap arrangement according to a second embodiment of the invention.
Figure 6:
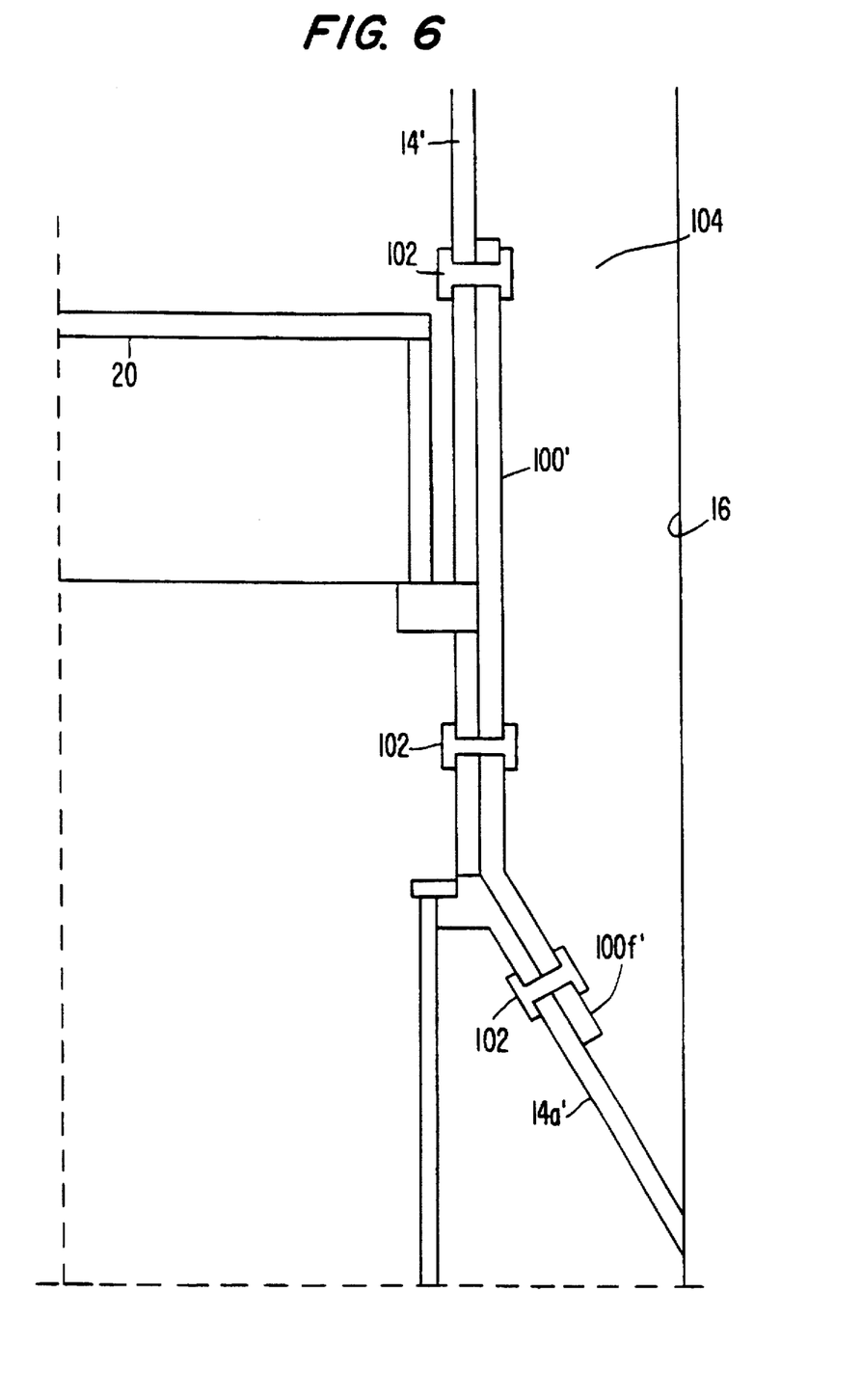
FIG. 6 is an enlarged view of a strap according to second embodiment.

FIGS. 5 and 6 show a second embodiment of the invention. This embodiment features a strap 100' which has an angled foot section 100f' and which is adapted for use with a shroud having a skirt portion 14a'. This embodiment is essentially similar to the first with this latter mentioned exception.

FIG. 6 shows the strap of FIG. 5 in enlarged form. In this drawing the use of P-bolt type fasteners is shown.

It will be noted that the length of the straps shown in FIGS. 3 to 6 is not limited to that shown in the drawings and can be of any suitable length. For example, it is clearly within the scope of the invention to make the straps long enough as to extend along a substantial portion of the height of the shroud and to span welds H4 to H8 for example.

It will be further noted that the upper ends of the straps can be formed with outwardly extending flanges which are adapted to be connected to an external support structure such as a tie rod or the like, and thus cooperate with this additional structure in a manner which will extend the supportive effect of the straps over the full length of the shroud. Alternatively, a hole can be formed in the shroud which allows an inwardly extending flange to be fitted through the hole and to be connected to an internally disposed support structure. As will be appreciated, in the event that a hole is formed in the shroud for the purposes of allowing a flange or projection to pass through into the interior of the shroud, the hole and the projection member should have very similar dimensions so that a relatively snug fit is achieved and the amount of water which can flow through any remaining gaps is minimized to the maximum possible degree.

THIRD EMBODIMENT

FIGS. 7 to 11 show details of a third embodiment. In the arrangement depicted in FIGS. 7 to 9, the straps generally denoted by the numeral 300, are formed of Inconel X-750 which has a lower coefficient of thermal expansion than the material from which the shroud is formed, which is, in this instance, 304 Stainless Steel. This arrangement therefore, establishes a temperature responsive bimetallic strain system wherein, as the temperature rises, the expansion differential which occurs between the straps 300 and the shroud 14 induces a tightening of the straps 300 and the generation of a clamping effect which is established with a predetermined increase in temperature.

Figure 7:
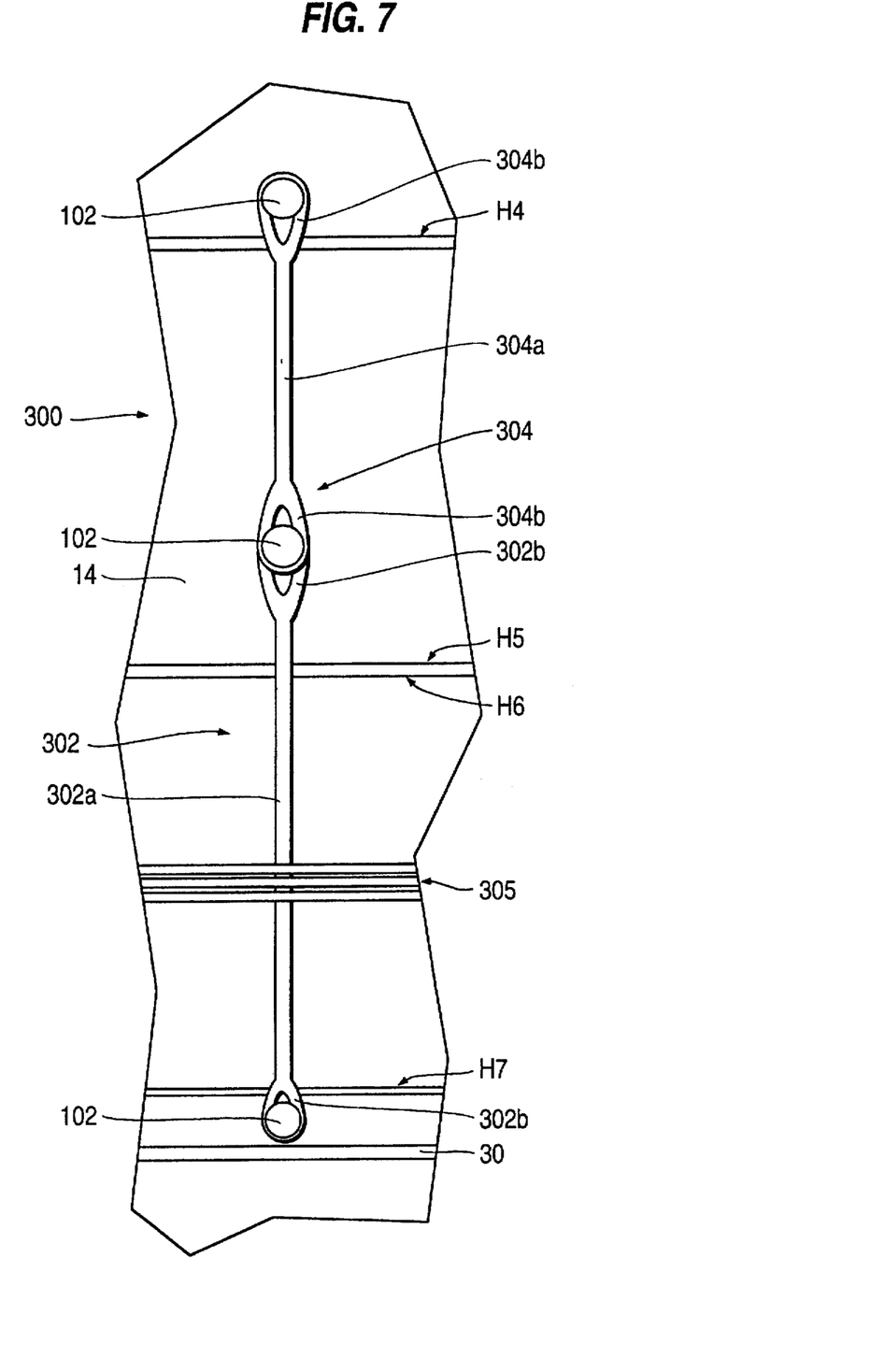
FIG. 7 is an elevational view showing a third embodiment of the invention.
Figure 8:
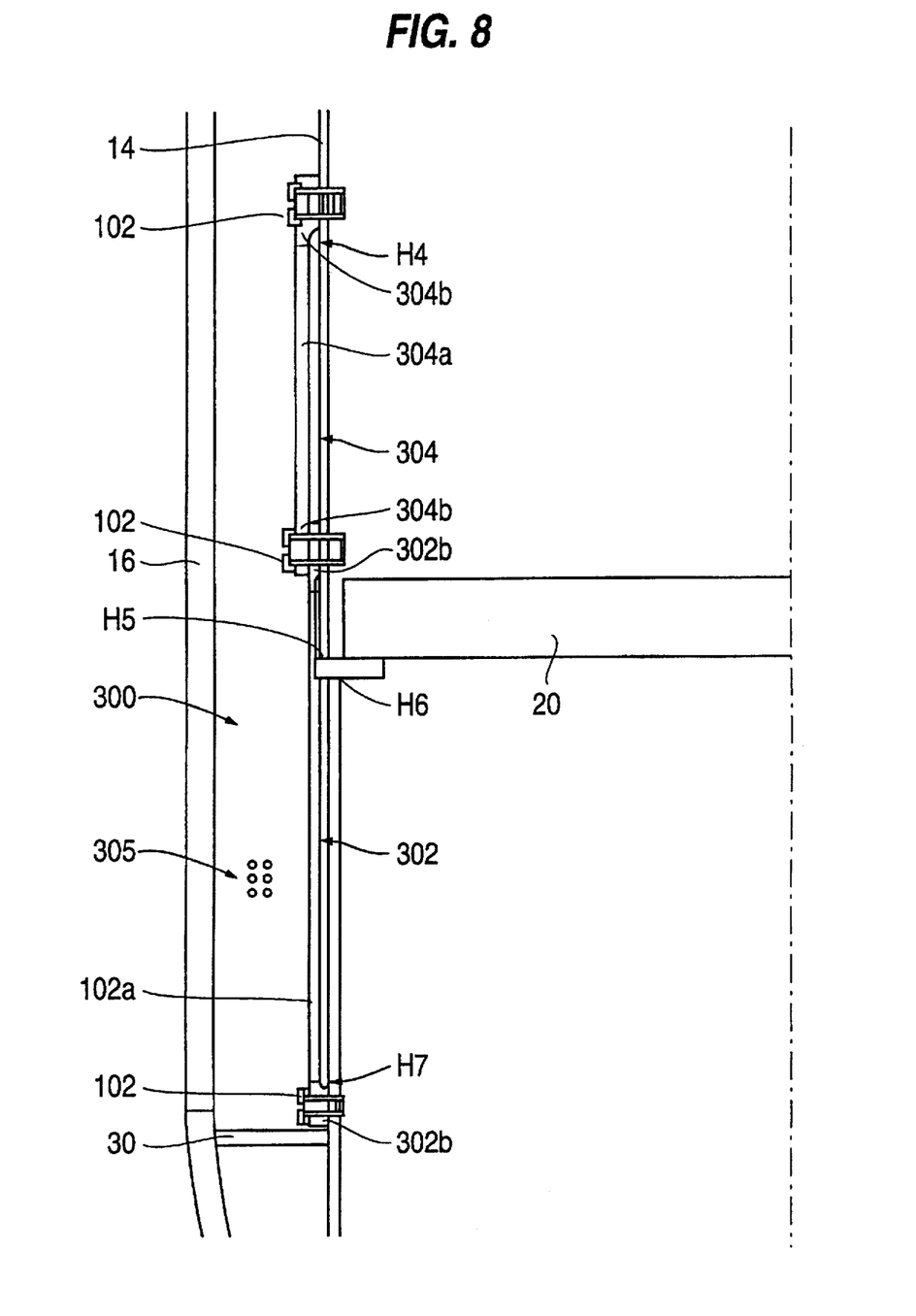
FIG. 8 is a side sectional view showing the arrangement depicted in FIG. 7.
Figure 9:
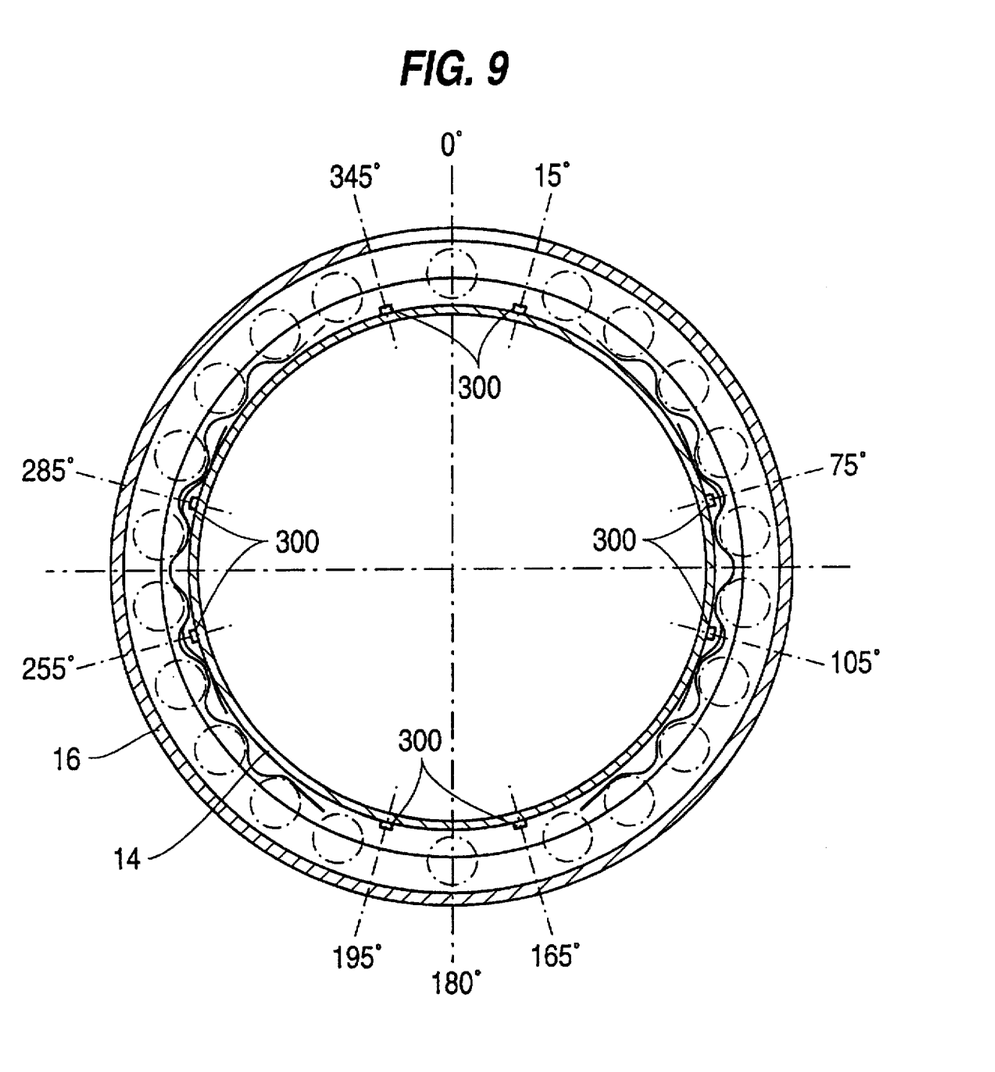
FIG. 9 is a plan view showing the positions in which the straps according to the third embodiment may be disposed around the shroud.

As will also be appreciated, since there is no temperature differential during installation, no load is applied by straps 300 under these "cold" conditions, and the installation of the straps 300 is greatly facilitated.

This embodiment is illustrated as employing two sets of straps 302, 304. It is, however, to be noted that the lower set of straps 302 which span the H5 to H7 welds may be used alone and that the second upper set of straps 304 are provided only if coverage of the H4 weld (for example) is required. The first set of straps 302 include some number of straps which are arranged around the periphery of the shroud 14 in the manner shown in FIG. 9.

The critical dimensions and number of the straps 300 are determined by the load which is required to be withstood and the temperature differential to which the straps 300 are apt to be exposed, along with the space available at the lower end of the shroud 14 below the H7 weld.

The pins or P-bolts 102 which are used to secure the lower ends of the lower straps can be smaller than the upper P-bolts 102, because of the greater bearing strength of the Inconel 600 support ring 30 which is provided at this location. By way of example only, the lower pins or P-bolts 102 are each approximately 3.5 inches in diameter. On the other hand, the upper P-Bolts 102 are approximately 5 inches in diameter.

As best seen in FIG. 7, the terminal portions 302b, 304b of the straps are formed so as to provide a loop of material which goes around the pin 102. An oval or similar type of hole is formed in this loop in order to provide uniform stresses in the strap. The straps have no welds and are formed either by forging or machining X-750 stock. The center sections 302a, 304a of the straps are sized to ensure that they can withstand the loads which will be applied by the bimetallic strain system and ensure that adequate support is derived.

As will be appreciated from FIG. 8, the straps 300 extend along in close proximity to the exterior of the shroud and thus are arranged so that a heat transfer path is established in a manner which tends to attenuate the temperature differential between the straps and shroud to a level lower than the fluid temperature differential which occurs, thereby maintaining the clamping force in a range below the material yield stress.

The strap design accommodates shroud weld areas due to the weld buildup and backing rings employed by this type of shroud design. The transition in diameters between the center and lower shroud sections is also accounted for in this way.

In this particular embodiment, the lower straps are each approximately 100 inches long, while the upper straps are each approximately 60 inches long.

It will be noted that in FIGS. 7 to 9 that the numeral 305 denotes a plurality of instrument lines which pass through the annular space defined between the shroud 14 and the reactor pressure vessel 16.

Figure 10:
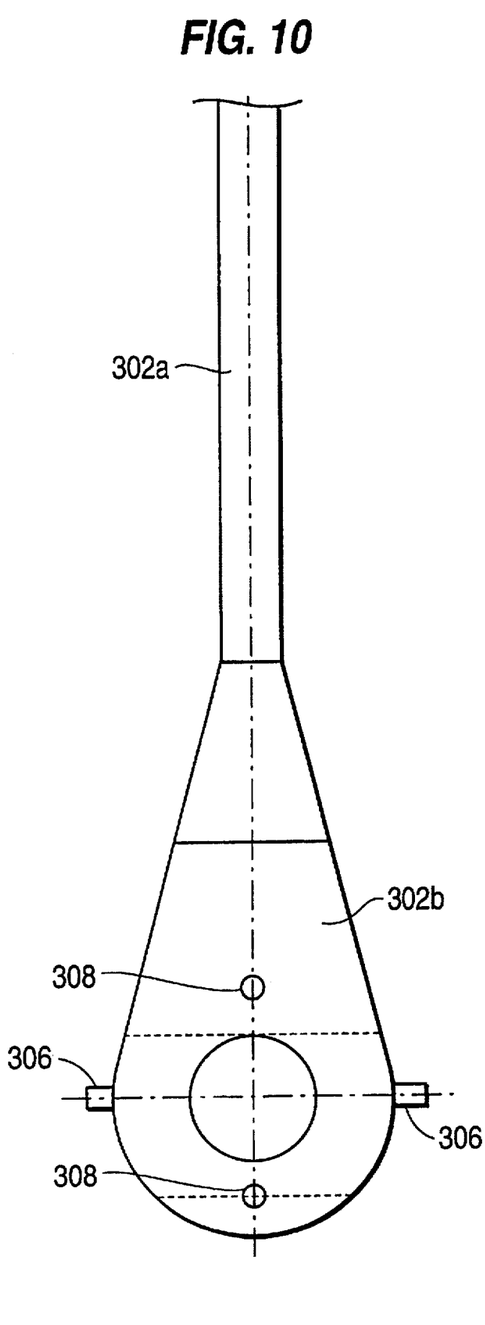
FIGS. 10 and 11 are respectively front and side views of an end portion of a strap which is provided with a support arrangement for an EDM cutting machine.
Figure 11:
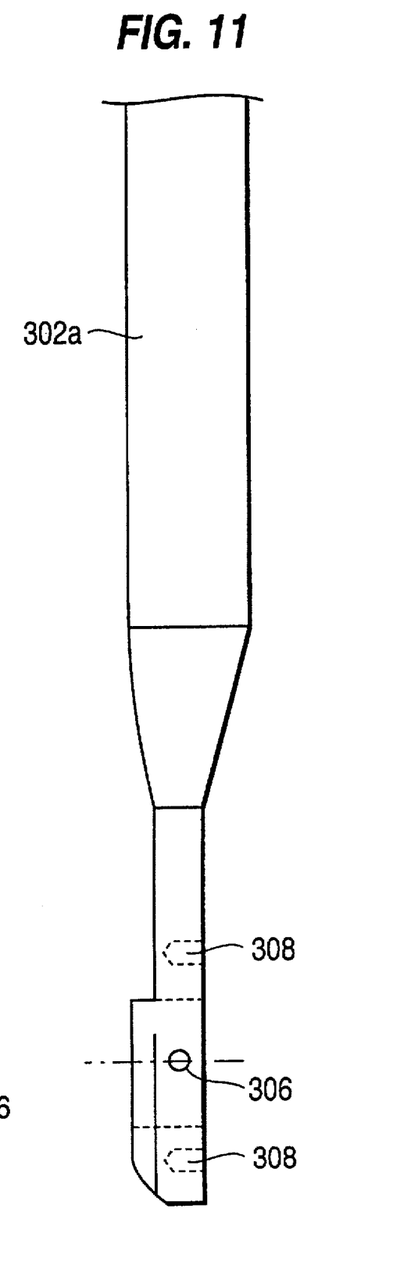

In order to facilitate the installation of the straps, integral fittings such as those illustrated in FIGS. 10 and 11 are provided to allow the attachment of the tooling necessary to EDM holes in the shroud for the pins. This allows some of the tooling to be delivered with the strap, reducing the overall time for installation. More specifically, the terminal ends 302b, 304b of the straps 302, 304 are provided with lateral holding tabs 306 and centering pin holes 308 which are used to support the EDM cutting machine in a predetermined position on the terminal end ready for cutting operation.

Although the present invention has been described with reference to only a limited number of basic embodiments, it will be appreciated that a number of variations and modifications are possible without departing from the scope of the invention and that the scope of the invention is determined only by the appended claims.

What is claimed is:

1. In a nuclear reactor having an essentially cylindrically-shaped shroud formed of a plurality of annular segments which are welded to one another:
   an elongate essentially linear strap, formed of a first material, which extends essentially parallel to an axis of the shroud and which is securely fastened to an external surface of the shroud made of a second material different from the first material and having a higher coefficient of thermal expansion than the first material thus providing a temperature responsive bimetallic strain system between the strap and the shroud which produces a clamping force when the temperature of the nuclear reactor increases to a predetermined level, said strap being arranged to span one or more welds of the shroud, said strap withstanding bending, shearing and tension forces which are applied to the shroud.

2. A nuclear reactor as set forth in claim 1, wherein said strap is securely fastened to the shroud using a plurality of bolt units which are adapted to be inserted into holes, each of said bolts units having a portion which can be expanded in a manner which secures the bolt unit in the hole in which it is inserted.

3. A method of repairing an essentially cylindrically-shaped shroud formed of a plurality of annular segments which are welded to one another, comprising the steps of:

forming a strap with a feature for locating a hole making device on the strap, said feature comprising centering pin holes, and lateral holding tabs, located on first and second terminal ends of the strap;

placing the strap against a predetermined portion of an external surface of the shroud wherein the strap spans at least one of welds which secure the segments of the shroud together;

forming a first hole through the strap and a second hole which is aligned with the first hole, through the shroud; and disposing fastening means through said plurality of holes to fasten said strap to the shroud and to render said strap integral with the shroud.

4. A method of repairing a nuclear reactor which includes a plurality of fuel rods and a shroud which is disposed about the fuel rods and which is made of a first metal, comprising the steps of:

placing a strap formed of a second metal having a lower coefficient of expansion than the first metal, against the external surface of a nuclear reactor shroud so as to span at least one weld formed in the shroud and to form a temperature responsive bimetallic strain system which produces a clamping force when the temperature within the reactor increases beyond a predetermined level; and securing said strap to the shroud using fastening means while the temperature within the reactor is below the predetermined level.

5. A method as set forth in claim 4, wherein said step of securing comprises the steps of:

forming a through hole which extends through the shroud; and disposing fastening means in said hole.

6. A method as set forth in claim 5, wherein said fastening means comprise a bolt unit which has a portion which can be expanded in a manner which secures the bolt unit in the hole in which it is disposed.

7. A method as set forth in claim 6, wherein the shroud is comprised of a number of segments which are welded together and wherein said at least one weld formed in the shroud is a weld which interconnects two of said segments.

8. A method as set forth in claim 6, further comprising the step of forming the strap with a feature for locating a hole making device on the strap.

9. A nuclear reactor as set forth in claim 1, wherein said strap further comprises a structure for locating a hole making device which forms holes, on said strap.

10. A nuclear reactor as set forth in claim 9, wherein said structure for locating a hole making device comprises centering pin holes, and lateral holding tabs, located on first and second terminal ends of the straps.

11. A nuclear reactor as set forth in claim 1, wherein said first material is Inconel X-750.

12. A method as set forth in claim 4, wherein said second metal is Inconel X-750.

13. A nuclear reactor as set forth in claim 2, wherein the strap is made of a uniform seamless metal, and the holes have an oval or other symmetrical shape that provides uniform stresses in the strap.

14. A method as set forth in claim 5, wherein the strap is made of a uniform seamless metal, and the holes have an oval or other symmetrical shape that provides uniform stresses in the strap.

* * * * *